United States Patent [19]
Kinzie

[11] Patent Number: 5,997,681
[45] Date of Patent: Dec. 7, 1999

[54] METHOD AND APPARATUS FOR THE MANUFACTURE OF THREE-DIMENSIONAL OBJECTS

[76] Inventor: Norman F. Kinzie, 45 Brentwood Cir., Needham, Mass. 02192-1903

[21] Appl. No.: 08/824,286

[22] Filed: Mar. 26, 1997

[51] Int. Cl.$^6$ .................................................. B32B 31/00
[52] U.S. Cl. .................... 156/263; 156/264; 156/353; 156/580; 156/510; 156/511; 156/267; 156/256
[58] Field of Search .................................. 156/263, 264, 156/256, 267, 268, 580, 511, 512, 516, 517, 59, 353; 264/401

[56] References Cited

U.S. PATENT DOCUMENTS

| | | | |
|---|---|---|---|
| 5,015,312 | 5/1991 | Kinzie | 156/63 |
| 5,071,503 | 12/1991 | Berman | 156/250 |
| 5,183,598 | 2/1993 | Hellé et al. | 264/22 |
| 5,354,414 | 10/1994 | Feygin | 156/630 |
| 5,578,155 | 11/1996 | Kawaguchi | 156/267 |
| 5,730,817 | 3/1998 | Feygin et al. | 156/64 |

OTHER PUBLICATIONS

*Rapid Protyping Report* A. Cohn, pp. 1–2 vol. 1 No. 6, Nov. 1991.
*Rapid Protyping Report* A. Cohen, pp. 3–5 vol. 5, No. 6, Jun. 1995.
A. Venus, pp. 261–273 "The Potential for a Low Cost, Retro Fit, Rapid Prototyping System", School of Engineering and Advanced Technology, University of Sunderland, Jul. 1994.

U.S. patent application 08/587,103 filed Jan. 11, 1996, 30 pages Kinzie, "Method and Apparatus for the Manufacture of Three–Dimensional Objects by Lamination".

*Primary Examiner*—James Engel
*Assistant Examiner*—Linda L. Gray

[57] ABSTRACT

A method and apparatus for constructing a three-dimensional object. There is provided a lamination unit for holding and pressing a block of material; a slicing unit for cutting the block to form a horizontal layer having a first working surface and a cut block having a second working surface; a profiling means for profiling at least one of the working surfaces into at least one planar element; and an electronic means for receiving XYZ information corresponding to the shape of the object, for processing the XYZ information into a plurality of computerized cross-sectional representations of the shape, and for controlling the operation of the lamination means, the slicing means, and the profiling means. Formation occurs by providing the electronic means with the XYZ information, placing the block in a position for holding by the lamination means; slicing the block to provide the horizontal layer having the first working surface and the cut block having the second working surface; profiling at least one of the working surfaces to form the planar element having a shape corresponding to the computerized cross-section representation at that slicing level; pressing the second working surface of the cut block against the first working surface of the horizontial layer using the lamination means; and repeating the slicing and profiling steps until the object is formed.

21 Claims, 4 Drawing Sheets

METHOD AND APPARATUS FOR THE MANUFACTURE OF THREE-DIMENSIONAL OBJECTS

TECHNICAL FIELD

This invention relates generally to improvements in methods and apparatus for forming three-dimensional objects and surfaces from planar cross-sectional shapes and more particularly to techniques which employ the "cut-on-the-stack" method of laminating each layer and then performing selective printing and cutting operations on that layer, whereby three-dimensional objects and surfaces can be accurately and economically fabricated with predetermined shape.

BACKGROUND OF THE INVENTION

During the early 1980's improvements in computer technology greatly facilitated the description, manipulation, and representation of complex three-dimensional information in digital form. This progress was particularly dramatic in the area of computer aided design (CAD). Methods of physical fabrication, however, were almost exclusively limited to old subtractive methods which were adapted for computer numerical control (CNC). Consequently, a number of people noted the great disparity between the ability to describe and represent complex three-dimensional information in digital, nonphysical, form and the ability to turn those descriptions into correspondingly detailed physical forms. This disparity between nonphysical and physical capabilities led an increased number of researchers to focus on a variety of new techniques which promised to provide fast and economical three-dimensional "hard copy," with little or no constraint on complexity.

Stereolithography, the first commercially successful method of "freeform fabrication," was first publicly demonstrated in late 1987. Since then a wide variety of new methods have appeared. Most of these new methods are performed in a layer-by-layer fashion and are characterized by their additive nature, either solidifying or depositing small portions of material onto an object being produced. One of these new additive methods is commonly called laminated object manufacturing (LOM). Unlike the others, however, LOM is distinguished by the fact that it employs both additive methods (lamination of a layer) and subtractive methods (cutting of a cross-sectional shape) in order to manufacture objects.

Part of the history of freeform fabrication and LOM is outlined in U.S. Pat. No. 5,354,414 to Feygin. This patent also suggests various methods of forming objects from layers of powder and from layers of sheet material. Of particular relevance to the current application are methods of "cut-on-the-stack" lamination which were added as new material on Oct. 4, 1989. These methods eliminate most registration problems by laminating a layer of material before cutting that layer of material to shape. In some embodiments described, it was also suggested that the surrounding material be left in place, in order to help support subsequent laminations. In each sheet-larnination embodiment the thickness of the sheet material is determined and formed prior to lamination.

The lamination work which I began in early 1986 was not described in the background to U.S. Pat. No. 5,354,414. This work focused exclusively on the lamination of sheet material and led to U.S. Pat. No. 5,015,312. It also led to the paper "Three-Dimensional Printing," dated Apr. 27, 1988 and subsequent editions, which were widely and nonconfidentially distributed to people who were involved in this field.

The lamination papers which I published all describe the "cut-on-the-stack" method and the advantages of cutting parting lines and leaving the surrounding material in place to form a supporting shell. In each embodiment, the thickness of the sheet material is determined and formed prior to lamination.

Since the commercial introduction of Stereolithography in 1987, the number of freeform fabrication research efforts has increased dramatically. Without attempting to cover all of the many variations, two methods should be noted here. They are "Shapemaker II," developed and marketed by Schroff Development Corporation of Mission, Kans., and "Computer-Aided Manufacturing of Laminated Engineering Materials" developed by CAM-LEM, Inc., of Cleveland, Ohio. Neither of these methods uses the cut-on-the-stack method. In each case, a cutting station is configured to prepare a single layer of material for lamination at a separate lamination station. In some embodiments, methods of five-axis cutting are used in order to vary the edge profile of individual layers for the purpose of reducing the "stair-stepping" error which is characteristic of methods which fabricate complex shapes by assembling or otherwise layering cross-sectional shapes which have square edge profiles.

The CAM-LEM, Inc. methods referenced above also include the construction of shapes from more than one material. At a special cutting station, these methods create component cross-sections from a selection of sheet materials, differing in both thickness and in composition. These cross-sections are then assembled into the product shape. In some cases, portions of individual layers are cut from sheets of specially formulated "fugitive materials." These materials are designed to provide structural support during critical phases of the fabrication process but to be reduced to a removable powder ash by heating the laminated object in an oven.

Additional methods of lamination from preformed sheet materials are included in currently pending U.S. patent application Ser. No. 08/587,103. These are hereby fully incorporated by reference herein as though set forth in full.

There are a number of drawbacks to each of the lamination methods and apparatus which have been disclosed to date. First, the drawbacks which apply to all of the methods, include:

A. Additive fabrication methods create objects by adding material in discrete increments. This creates the dilemma of either accepting undesirable discontinuities, or "stairsteps," in the surface or of reducing the increment size to a point which makes fabrication time and cost excessive for many purposes. Since laminated object manufacturing is a hybrid which also uses subtractive methods, it has the potential to entirely eliminate stairsteps and other unwanted discontinuities in shape. However, the subtractive mode is not yet fully exploited. The vertical-edge cutting of the current LOM hybrids cannot yet produce shapes which are equal in accuracy and smoothness to the shapes produced by conventional, purely subtractive, milling machines.

B. Since both the geometry and the use of laminated objects vary widely, it is advantageous to be able to vary the sheet thickness, both within one laminated object and between successive laminated objects. Since laminated objects are currently fabricated from sheetstock which is created by an entirely separate process, however, it is impractical to provide preformed sheet materials in every thickness which may be determined to be optimal for a particular layer. The conventional LOM approach to using preformed sheet materials is to supply sheet material which is thin enough for the most complicated portions of a particular project and to accept the inefficiencies of using a thinner-than-optimal material in less demanding portions of the project. When relatively simple objects are fabricated from thinner-than-optimal layers, the time penalty of unnecessary lamination is cumulative over many layers. In "cut-on-the-stack" apparatus material thickness changes are only made when absolutely required, with manual intervention. In the more complex "cut-off-the-stack" apparatus, changes in thickness may be somewhat easier, but are severely limited by the supply stock which is available.

C. One way to achieve optimum layer thickness is to use a variation on "layer-planing" operations which are fundamental to related methods of freeform fabrication, such as those employed by Sanders Prototype, Inc. of Wilton, N.H., and Cubital, Ltd. of Raanana, Israel. The LOM variation on this method would laminate a thicker sheet than required and then create a new "working plane" on a layer of optimum thickness by removing the excess portion of material. This alternative increases the percentage of raw material which must be discarded as waste.

D. When laminated layers are thin, they have little structural strength or resistance to deflection perpendicular to the slicing plane. This weakness makes support of cantilevers and bonding of layers particularly critical. This increases the need for excess material to be left in-place for structural support and increases the need for selective bonding, to facilitate detachment of the excess material. The need for support also creates special problems at internal voids.

E. The lamination of certain materials offers special functional potential beyond visualization and prototyping. Unlike the papers and plastics most commonly used in current lamination machines, the cutting and bonding characteristics of materials such as metals and green-state ceramic and metal powders may make it especially helpful to be able to adjust the relative usage of additive versus subtractive modes of fabrication. Especially when precision and smoothness are important, it may be advantageous to minimize the "additive mode" by reducing the number of laminations to a minimum, while simultaneously maximizing the "subtractive mode" by increasing the amount and sophistication of cutting done at each level.

F. With conventional LOM machinery, all automated cutting must be done layer-by-layer. Due to the difficulty of positioning and holding the product on a suitable automated subtractive cutting machine, any final shaping operations must be accomplished by hand. Such manual operations are expensive, time consuming and vulnerable to error.

G. All fabrication processes are subject to unanticipated errors. Prior-art lamination machines lack the capability to remove and replace an unacceptable layer or layers; they generally require that errors be corrected by disposal of an entire product and repetition of each and every layer.

H. When laminated objects are built from preformed sheet materials, there are special difficulties involved in uniformly pressing and bonding sheets which are nonplanar.

Second, there are drawbacks which are specific to methods which cut cross-sectional shapes at a special cutting station and then assemble composite shapes at a lamination station, including:

I. When cutting and lamination are accomplished at separate stations, as in the CAM-LEM methods, there is a separation of crucial operations. These methods require the separate "gripping" of each newly cut sheet and then the transfer, placement and lamination of that individual sheet. The many grip-and-place operations, at least one for each layer, increases the opportunity for error. For certain purposes, however, the CAM-LEM methods offer important new options, including the fabrication of individual object layers from more than one material.

J. When cutting and lamination are accomplished at separate stations, there are special problems associated with cutting severely sloped edges. These are largely due to the lack of structural strength and support of the extreme edges, where material thickness approaches zero. In the case of laser-based machines, there is sometimes the additional problem of the condensation of vaporized material on a surface which must still be bonded. Additional difficulties may be encountered in ensuring uniform support and lamination pressure where severely sloped edges must be bonded.

K. Various algorithms have been developed in order to better approximate complex surface shapes. To date, however, it appears that no such publicly disclosed method can adequately handle changes in surface slope which do not occur along slicing planes. While this may not be significant for minor slope changes, it is a potentially serious limitation at severe slope changes, such as from a positive slope to a negative slope. If such lines of change are horizontal, the slicing plane may be adjusted to correspond, but if such lines of change are sloped, as in the thread of a screw, more sophisticated cutting capability will be required.

Third, there are drawbacks which are specific to methods which exclusively "cut-on-the-stack," including:

L. When all cutting is done on-the-stack, it is most natural to cut only one layer at one time. Although it is theoretically possible to have more than one cutting tool working on that layer, there are severe practical limitations to the obvious alternatives. Consequently, cut-on-the-stack lamination is an inherently "serial" process, like other prior-art additive fabrication methods in which one layer is fabricated at a time. Unobvious methods of parallel fabrication are one subject of my pending U.S. patent application Ser. No. 08/587,103.

M. Cutting on-the-stack has limited lamination apparatus to one accessible working plane for each lamination. This is because the opposite side of each lamination is bonded to the previous layer before any operations can be performed on it. This limitation will become more significant as lamination machinery is adapted to profile cross-sections with edge cuts which are not vertical.

For all of the above reasons, there is a clear need to improve the LOM process, particularly in the areas of quality of output, efficiency, versatility, speed and reliability of production. The present invention clearly fulfills all of these needs.

SUMMARY OF THE INVENTION

Briefly, and in general terms, the present invention provides a new and improved method and apparatus for layer-by-layer fabrication. In a presently preferred embodiment, by way of example and not necessarily by way of limitation, the method and apparatus has many advantages over previously disclosed embodiments of laminated object manufacturing. Many of these advantages result from the following features:

A'. The new fabrication method allows the use of subtractive cutting to be optimized for each material, geometry and product purpose. At one extreme, when the subtractive mode of this invention is maximized, the method is nearly indistinguishable from conventional five-axis CNC milling, because the additive mode is reduced to a single lamination. Although the apparatus must be different, in order to enable both addition and subtraction, there is no reason why this novel apparatus could not also be utilized for the entirely conventional CNC milling of a single block of material. At the other extreme, when the additive mode is maximized, because the layers are extremely thin and the subtractive cutting uses only three axies, much of the method appears superficially similar to conventional LOM. In between these extremes, the method will optimize the complementary use of: 1.) lamination for special variations in geometry and/or materials and 2.) cutting for fastest and most accurate fabrication of smooth shapes.

B'. The method described herein includes the lamination of an entire block of supply stock, instead of a single sheet. The added material can then be sliced at the optimum level, in order to separate it from the supply stock and thereby create a bonded layer of material. This allows just-in-time customization of layer thickness. When geometry is simple, and suitable to the subtractive cutting capabilities of the specific apparatus, layer thickness can be maximized and lamination count and time minimized. When product complexity requires, however, the layer thickness can be reduced accordingly. This means that time does not have to be wasted on unnecessary laminations.

C'. The new "cut-on-the-stack" sheet slicing method allows the creation of optimum layer thickness without the waste which would be required by the "layer-planing" methods available from the prior art, which cut and dispose of excess material.

D'. The ability to customize layer thickness allows relatively thick layers to be used when appropriate. In some situations, their strength will eliminate the need for construction of support structure. When the supporting shell is rendered unnecessary, there will be less need to provide the capability to selectively bond each layer, so as to maintain detachability from a surrounding support shell; uniform bonding will be acceptable. Furthermore, greater layer strength will facilitate the construction of objects with internal voids, without temporary support of any kind.

E'. When materials are relatively difficult to bond but easy to shape, or when precisely smooth shaping is a priority, laminations can be reserved for only the special conditions which absolutely require them. This may be illustrated by the lamination of metal tooling with the minimum number of layers required to fabricate the special features, such as internal cooling channels, which present special difficulties for subtractive cutting. Difficult bonding steps, using high pressure and/or high temperature, would be reduced while conventional five-axis CNC milling would be used to greatest advantage. Moreover, thick layers will allow the option of "spot bonding," or of conventional mechanical fasteners, instead of the full-layer bonding generally required by thin-layer lamination. In the extreme case of diffusion bonding, the incorporation of layer-slicing capability may also help reduce the problems of oxidation and/or contamination of the bonding plane.

F'. When CNC milling tools and lamination machinery are combined to create shapes without a completely surrounding support structure, it will be possible to supplement layer-by-layer cutting with final shaping of accessible exterior portions of the product. Depending on geometry and other factors, this feature may be used to smoothly and accurately "finish" products which have been "roughed" during layer-by-layer fabrication. This final milling will be facilitated by support structures which are designed by special software, constructed during lamination and then cut away in special sequence, as final finishing permits.

G'. The method and apparatus of this invention will allow the detection and removal of portions of the product which fail to meet quality standards. When the unacceptable layer (s) have been sliced off and disposed of, lamination and shaping can continue with minimal loss of time and materials.

H'. When the laminated product and the supply block can both be shaped during fabrication, it will be possible to join them with a bonded surface which is nonplanar, without customization of the pressing apparatus itself. For certain uses and machines, this will also add the advantage of being able to introduce preformed sheet materials at selected levels within the fabrication process. These preformed sheet materials might add special structural characteristics, such as the strength of long-fiber composite reinforcement, along critical portions of the product.

I'. At least one embodiment of the invention, using interchangeable carriages to carry supply material, adds the capacity to bond and slice layers of material from supply blocks of different materials. Unlike prior-art cut-off-the-stack methods, this will allow each material to repeatably held in accurate position, through use of specially designed pallets, or carriages. This eliminates the need to grip and release each planar element and reduces the risk of error.

J'. When cutting is delayed until after lamination, the difficulties of severe edge slope will often be reduced. This will either be because of sufficient structural support from adjacent layer(s) or because the sharp edge angle has been eliminated by cutting the previous layer in nonplanar fashion, so as to receive the following layer in a partially "inlaid," or "let-in" fashion.

K'. The various cutting alternatives of this invention will allow many complex shapes to be cut in more accurate and smoother approximations of the defining geometry. Besides the use of different cutting tools, these alternatives include; a.) cutting before lamination, b.) cutting after each lamination, and c.) cutting after multiple laminations. Such options will even meet the challenge of smoothly shaping sharply defined features which slope through slicing planes, such as screw threads.

L'. When cutting is done "off-the-stack," as in some embodiments of this invention, multiple possibilities open up. These include multiple cutting stations which can simultaneously work on different layers, cutting those layers from one or more supply materials. This potentially adds the speed advantage of "parallel processing," in which more than one layer is under construction at a given time. This could also add the "fault tolerance" of parallel processing, in which multiple work stations are networked in a fashion which allows the work load to be redistributed when one unit fails.

M'. Certain embodiments of this invention allow a combination of cutting on-the-stack and off-the-stack. In apparatus which is not sophisticated enough to take advantage of the parallel processing options, this will allow profiling of layers which are thicker and/or more complex in edge shape than would be possible with only cutting on-the-stack. This is because two working planes are exposed, instead of just one, for each planar element which is constructed.

BRIEF DESCRIPTION OF THE DRAWINGS

In the drawings wherein like reference numerals represent like parts.

DETAILED DESCRIPTION OF PREFERRED EMBODIMENTS

Figure 1:
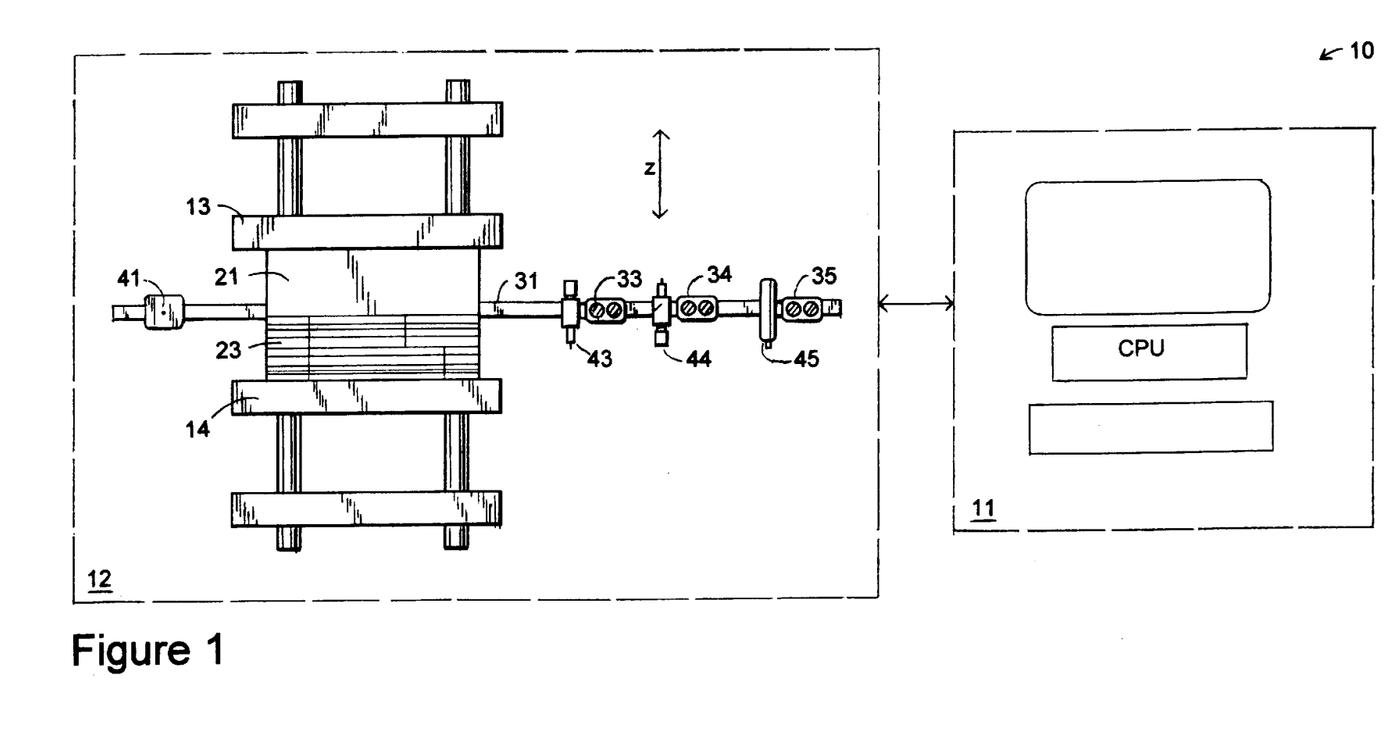
FIG. 1 is a cross-sectional view of the apparatus, showing the lamination of a supply block of material to a stack of laminated layers.
Figure 2:
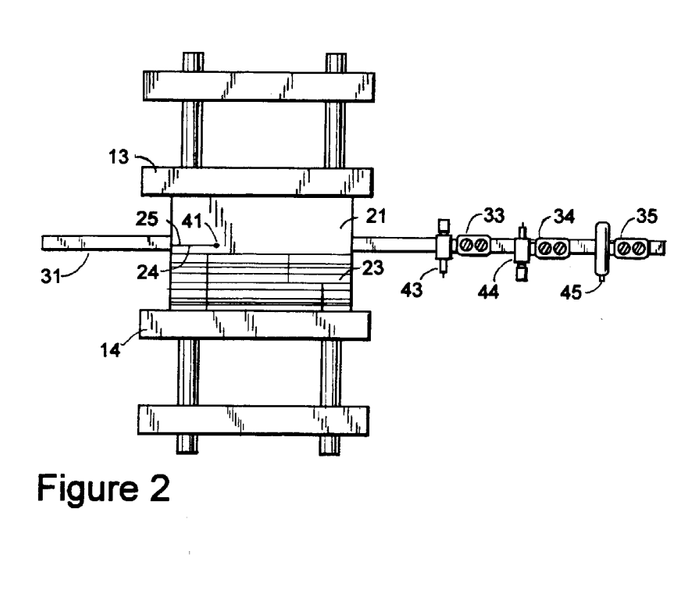
FIG. 2 is a cross-sectional view of the apparatus shown in FIG. 1, illustrating the use of a horizontal hot wire to slice a bonded layer of material free from the supply block above.
Figure 3:
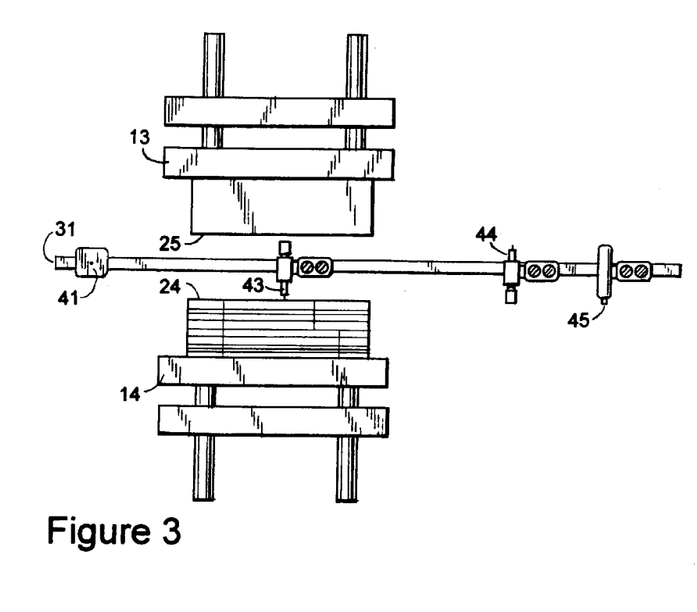
FIG. 3 is a cross-sectional view of one embodiment of the invention, illustrating the action of one XY cutting tool.

Referring now to the drawings, FIGS. 1–3 show simplified cross-sectional views of one embodiment of an apparatus for the manufacture of three-dimensional objects according to this invention. The method of this invention involves a repetitive cycle of addition and subtraction. In general illustration of this cycle, FIG. 1 shows the addition of a block of supply material 21 by lamination; FIG. 2 shows the creation of a new working plane 24, by the subtractive slicing of excess supply material; FIG. 3 shows hot-probe 43 moving over the working plane 24 as required to profile a planar element, by subtractive cutting of excess material. The three-dimensional object is thereby constructed from a series of individually contoured laminations.

Focusing now on FIG. 1, the apparatus is identified by reference numeral 10. Apparatus 10 includes a computer station 11 and a fabrication station 12. For ease of viewing, portions of the apparatus not pertinent to the invention are not shown.

Computer station 11 includes components for the input, storage, processing and display of data. The data includes XYZ information, corresponding to the shape of the three-dimensional object, taken over a plurality of different cross-sections and constituting a computerized representation of each of the cross-sections. The data is analyzed to determine the preferred combination of additive and subtractive methods, based on information regarding specific capabilities and limitations of both the material and the apparatus. Fabrication is planned so that at levels of the object where geometry or change of material require the addition of material by lamination and the creation of a new working plane, an entire block of material is added by lamination. The computer hardware and software for the planning and coordination of operations are not a part of this invention. Computer station 11 is connected to the fabrication station 12.

Fabrication station 12, in FIG. 1, consists of upper press 13 and lower press 14. Presses 13 and 14 are both capable of controlled vertical motion and lamination pressure, provided by motors through linear actuators. In this case, a block of supply material 21 is held on upper plate 13 by some mechanical, or other, means and a product 23 is built on lower press 14 and held by similar means. Depending on the materials involved, the holding means may use methods such as pressure sensitive adhesive, suction, mechanical, or magnetic grip.

Guide rail 31 is supported beside, and at a central elevation to, apparatus 12, along with a parallel and coplanar companion rail which is not shown. Cross-rail pairs 33, 34, and 35 are configured, motorized and controlled so as to be independently capable of moving tools 43, 44, and 45 between supply material 21 and product 23. In FIG. 1, during lamination, unused tools are "parked" on one side of the lamination press or the other, so as to avoid interference with other operations. The mechanisms and controls are similar to those currently used in flat-bed style pen plotters and vinyl cutters. In the case of machines which "profile" planar elements with both vertical and sloped edges, additional elevation control will be required, either in the tool holder, the XY-tool-moving apparatus or in the Z-pressing apparatus.

In this embodiment, supply material 21 is a plastic foam which is suitable for constructing shapes which can be used for visualization and mold making. This particular foam is capable of being cut by a hot wire 41 and , alternatively, by a hot-probe 43 or 44, which consists of a highly conductive metal such as aluminum, which is heated by electricity. Supply material 21 can be bonded by means of a pressure-sensitive adhesive which is selectively applied by adhesive-jet tool 45, in areas where bond is desired.

The creation of new working planes 24 and 25 is shown in FIG. 2, in which hot wire 41 slices a layer of optimized thickness off of supply block 21. Working plane 24, on the product block 23, is considered "essential" because it is created at a level which is determined by computer analysis in order to allow the required operations to be executed, according to the capabilities of the specific apparatus and the characteristics of the specific supply material. In contrast, working plane 25 is created at the same time but is considered "optional," because it does not necessarily have to be utilized.

Referring now to FIG. 3, some operations are executed on working plane 24 and other operations on working plane 25. Specifically, hot-probe 43 is shown profiling portions of product block 23. Subsequently, but not shown, hot-probe 44 will be instructed to profile portions of supply block 21, in preparation for the next lamination. This profiling can be used to facilitate the creation of certain shapes and to allow the addition of thicker layers, that might not otherwise be practical if cut from only one working plane. In addition hot-probes 43 and 44 will be used to cut parting lines which are required to facilitate the removal of surrounding material after lamination is complete.

FIG. 3 also shows applicator tool 45 which is designed to apply materials which are required to facilitate the required bonding between layers. In this embodiment, tool 45 is applying a pressure sensitive adhesive in areas where additional material is to be added by lamination. Bonding agent can be applied to either working plane, before or after profiling. The characteristics of the specific material and apparatus will determine which option is used.

Figure 4A:
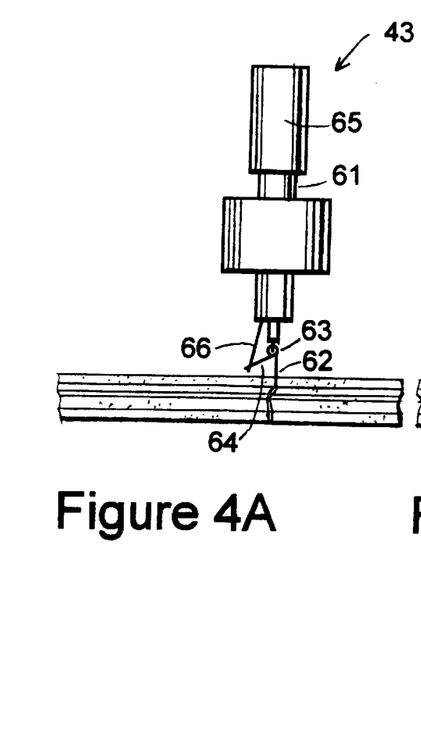
FIG. 4A is an elevational representation of a special two-axis hot-probe cutting device, for movement by an XY motion apparatus.
Figure 4B:
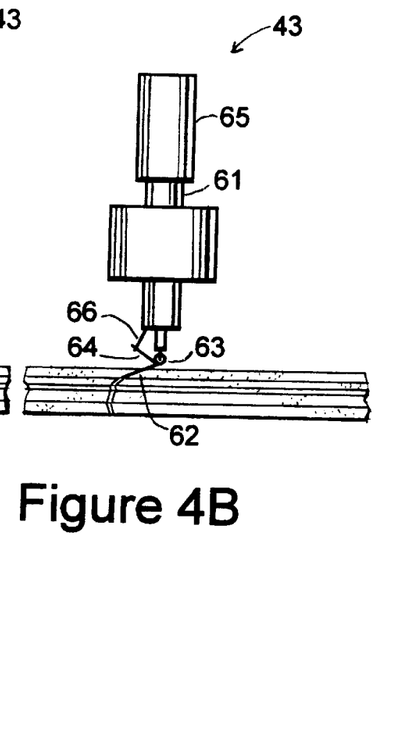
FIG. 4B is an elevational view of the hot-probe shown in FIG. 4A, illustrating inclination of the hot-probe from vertical.

FIGS. 4A and 4B show details of hot-probe 43, cutting a vertical cut and cutting a sloped cut. Probe 43 consists of a barrel 61, which can be rotated by a motor which is not shown (but is similar to methods commonly used with tangential knives), a electrically heated tip 62 which is pivoted at 63 and equipped with a lever arm 64. A semi-rigid linkage, 66, connects the lever arm, through barrel 61, to a small linear actuator 65 which rotates with the barrel. Under direction of computer, and in conjunction with the elevational mechanisms of upper press 13 and lower press 14, this assembly is capable of constructing planar elements by cutting contour cuts to shape cross-sections and also capable of cutting parting lines to facilitate the removal of excess material. When appropriate, the perimeters, or contours, of the planar elements may be profiled with simple vertical cuts or with compound curves (cut at varying angle to vertical). It should be noted that the profiled cross-sections are considered planar elements even though they never exist in unattached form.

Figure 5:
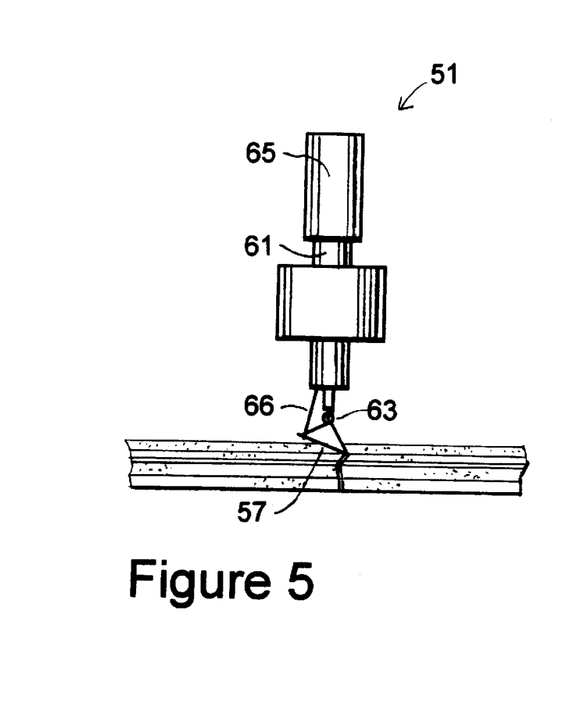
FIG. 5 is an elevational representation of a special two-axis hot-plane shaping device, for movement by an XY motion apparatus.

FIG. 5 shows a tool variation called a hot-plane 51, which can be used, with a mechanism similar to that of tool 43, to create more shallow, close-to-horizontal, slopes when it is appropriate. Hot-plane 51 is similar to hot-probe 43 in most mechanical respects, including barrel 61, pivot 63, actuator 65 and linkage 66. The capability of forming slopes is due to the geometry of the heated surface 57, which can heat relatively broad areas at varying angles from vertical. Affected areas of plastic foam contract away from the surface, as if they were pushed. An additional function of this tool may be to heat areas of excess foam so that they contract in a way which creates access space.

The tools of FIG. 1 can be configured in a manner which allows them to work on the growing product block 23, or on the exposed lower surface of the supply material 21. In fact, computer analysis of specific shapes may determine that it is most appropriate for some cuts to be made before bonding and some cuts to be made after bonding. When cutting is done on the supply block, before bonding (possibly involving excess cutting which damages the feedstock), the machine may be directed to "dress" the supply block after the profile is sliced off and before the following lamination is profiled or bonded. This might be accomplished by the removal of any damaged material by hot-wire 41, along with disposal by a waste-handling device not shown.

Figure 6:
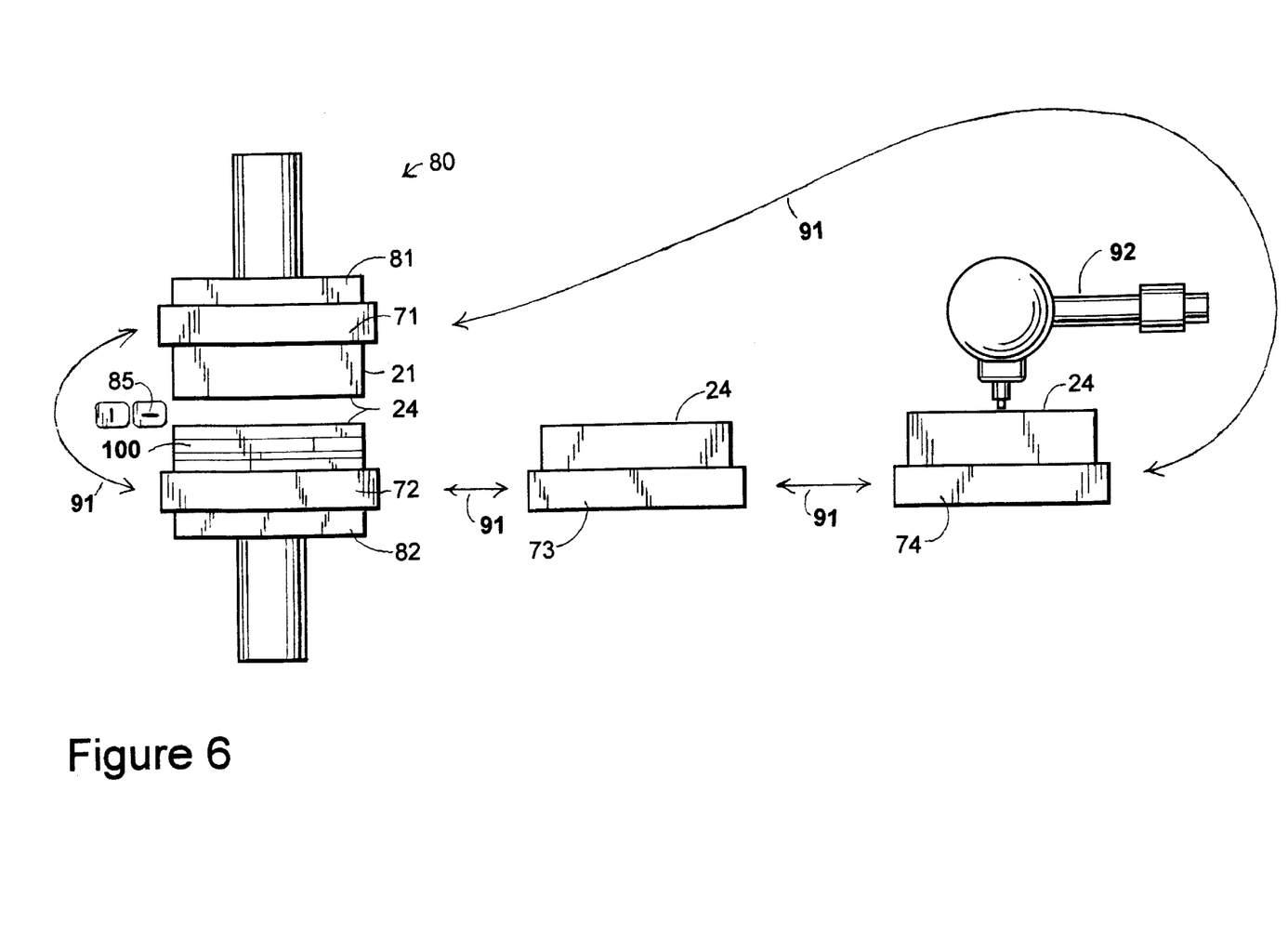
FIG. 6 is an elevational representation of another embodiment of the invention illustrating a lamination press with interchangeable material-handling pallets which are moved by conveyor mechanism between the lamination/slicing station and a cutting station.

FIG. 6 shows another embodiment of this invention. This is a variation which uses the technology of automated assembly line work cells and robotic pallet manipulation, wherein materials are mounted on carriages 71, 72, 73, 74, which can be moved between work stations, according to schematic path lines 91. At any work station each carriage can be positioned and accurately registered so as to allow highly accurate work to be performed on the materials which are carried.

These carriages use a combination of mechanical and electrical devices to control and measure location and to coordinate work. Although not shown, additional work stations could simultaneously provide special capabilities and increase both speed and fault tolerance by distributing the work load. Special capabilities could include a variety of cutting devices and other tools for the performance of specialized operations at a particular layer.

In this embodiment a press station 80 is equipped with upper press 81 and lower press 82, which can hold work carriages and exert lamination pressure. The exact means of vertical motion and mechanical control are available from the prior art and are not a subject of this invention. Band saw 85 is constructed with press station 80 so as to be able to slice material at the desired elevation. In order to be able to slice through the supply block 21 and allow the "return" of the circular band, the band saw may require special wheels and guides to maintain blade tension and position while the cutting portion of the band is advanced through the material being cut. In some embodiments, an additional grinding and polishing mechanism, or capability, may also be included in order to properly prepare surfaces for lamination.

Robot arm 92, in FIG. 6, illustrates one way to accomplish various tasks upon the working planes 24 of materials carried by work carriages, using as many degrees of freedom as the tasks require. This robot arm may be equipped with an automatic tool changer and interchangeable tools or it may be supplemented by various other mechanical devices in order to prepare materials for bonding, by the application of a bonding agent or a bond breaker, and so as to be able to cut cross-sections and parting lines. The cutting capability may be limited to straight-line cuts (simple or compound angles) or it may be enhanced to include more complex profiles. Many existing methods of cutting tool and product manipulation are available for use, including methods which move the product being cut in simple or complex motions and methods which move the cutting tools, or suitable combinations of both.

In this illustration product block 23 is being built by the layer-by-layer bonding of materials which are sliced from blocks pressed down from above. The diagram shows the configuration after a layer has been bonded and cut free from the supply stock and before the carriages, 72, 73 and 74 are moved for the next step in the cycle. The use of multiple carriages allows for shaping and bond preparation actions to be accomplished simultaneous to lamination of two sections. It also allows for a choice of different materials to be shaped and sliced from different carriages and then combined into a complex product. For instance, one carriage might carry a material of one density or rigidity and another carriage might carry a material with a different density and rigidity.

As long as it is efficient and dependable, the motion method and motion path of the carriages can be varied in many ways and are not a subject of this invention.

In addition, the FIG. 6 embodiment allows the product to be built from one material and any support structure which may be necessary to be built from another material. These materials might be selected and coordinated for economy, for ease of detachment or for other function such as support during construction and/or post processing, such as pressing, heating or firing. As one side benefit of the lamination capability, it may also prove advantageous to provide supply blocks o f v varied cross-sectional dimension, so that the cross-section of the rough shape may be reduced, material usage, and subtractive cutting minimized. In some situations, it will be advantageous to construct a fully- or partiay-surrounding shell of support material; in others it will be better to allow all the surrounding material to be cut free, removed and disposed of, without building a surrounding s hell. The waste-removal mechanism may be similar to one currently used in conventional milling machines or it may include a specialized mechanical pickup device.

The embodiments of the present invention described above are intended to be merely exemplary and those skilled in the art shall be able to make numerous variations and modifications without departing from the spirit of the present invention. The wide range of potential materials used in lamination will require a similarly wide range of material handling, bonding, and cutting methods. For example, the required cutting operations could be performed by many other tools available from the prior art, including lasers, abrasive diamond saws and burrs, band knives, ball endmills, and waterjets. For some embodiments, the profile cutting could be accomplished by a miniaturized air-powered burr, modified from dental applications, for five-axis cutting motion similar to that of hot-probe 43.

In some situations, such as the preparation of metals for diffusion bonding or the production of highly accurate parts, the slicing by one tool may be coordinated with grinding and/or polishing by other tools. In some machines, the work holding carriages may even be designed and coordinated so that they can be mechanically transferred to a turning center, for rotational cutting around the "Z" axis.

Additionally, the bonding could be facilitated and accomplished by a variety of means. For example, bonding could be provided by tools which apply materials to either the exposed surface of the product or to the exposed surface of the supply block. Bonding agents which could be applied range from simple pressure sensitive adhesives to brazing powders for use with metals which are oven fired, to adhesives which are cured by radiational energy. In some cases, it may be appropriate to selectively apply a bond inhibitor, such as a protective layer or a release agent and simultaneously or subsequently apply a general coating of a volatile solvent, closely coordinated with the lamination-press step. Two-part catalytic bonding may be accomplished by applying one component to one side and another component to another side. Alternatively, the catalyst could be microencapsulated so that the adhesive is not activated until application of the lamination pressure. Attachment can also be accomplished or assisted by the use of materials which create mechanical connections, including pins, bolts, screws. Furthermore, basic attachment can be accomplished with interlocking features; additional strength might be provided with additional materials.

Diffusion bonding of metals might be accomplished with both heat and pressure and enhanced in some areas by "printing" an intermediate coating or layer of another metal, or it might be selectively inhibited by the printing of a special contaminant where bonding is not desired. The use of carriage movement between work stations will help facilitate the maximum usage of each work station. For instance, shaping work may be performed on one project while lamination work is performed on another project.

The apparatus described would be designed to vary the depth of lamination in order to best suit the needs of each product and the varying shape of that product with the profile cutting capabilities of the machine. With a vertical-profile cutting machine for instance, quick copies might be made with coarser layers and higher quality copies might be made with thinner layers. Certain portions of each shape might be amenable to thick cross-sections and other portions might require very fine cross-sections. Furthermore, the slicing planes do not have to be parallel or even planar; some shapes and purposes may be well served by variations from parallel-plane slicing made possible by special cutting apparatus. As one example, a band saw could slice high-density foam in curved planes. As another example, milling machinery could create more complex mating shapes, which could be designed to reduce the structural importance of a bonding agent.

Although the preferred embodiments described above never allow constituent material to exist as an independent sheet, there are variations in which preformed sheet material is incorporated into a product built by these methods. There are also variations in which the supply stock is used as a source for slicing off free sheets of material, in whatever thickness is appropriate. These layers can be used in other lamination methods, from the prior art, thereby freeing them from the limitation to a single or a few sheet thicknesses.

While this method describes the "lamination" of a material, it is also possible that the fuill bonding is not accomplished until after the shape has been completed. For instance, materials might be minimally held in position by one or more initial means, such as their own weight, spot welding, penetrating pins, or mechanical interlock, and subsequently bonded by irradiation or by heating in a furnace, to melt a brazing powder or paste or to fire green state materials, including metals and ceramics in the form of powders bound together by polymer. Furthermore, this LOM method may be used for the construction of porous shapes which are suitable for subsequent impregnation with secondary materials, in order to enhance engineering characteristics such as strength.

Also, means can be provided for the creation of voids. This could be by laser vaporization of material, or by a variety of subtractive methods, including cutting a section of material free and lifting it for disposal by a suction, magnetic, mechanical or similar gripping device. Additionally, the product can be built either with a surrounding shell to support cantilevers, or without a surrounding shell, depending on circumstances.

In addition, the layer-by-layer processing described above can be used to facilitate other processes, in addition to the production of shape. During construction of the shape, additional tools can accomplish such tasks as installing electrical or mechanical components, print inks or other trace materials.

Alternative embodiments of this invention include the ability to perform additional tasks such exterior shaping, or "finishing," after the initial phase of layer-by-layer construction, or "roughing" is completed. Depending on the material and the geometry of a particular shape, in fact, certain operations might be more efficiently accomplished as part of "post processing," after the layers are assembled and critical internal, hard to access, etc. operations have been performed. This will be most practical in cases where the object can be constructed with minimal temporary support, as in the case of layers which are thick enough to support the required cantilevers. Alternatively, some operations, such as external shaping of a particular portion of a product, may be delayed only until one or a few layers have been laminated above that portion, instead of until after all laminations are complete. This strategy might allow cutting to be done with the efficiency and precision of CNC milling methods, over several bonded but still accessible layers, but without the requirement of machining an unsupported edge near the exposed plane of next lamination.

Lamination machines using the methods of this invention may also include loading and unloading devices. These would allow the replacement of a depleted supply block with either a new, full size, block or with a partial block, left after the completion of another product. It would also allow the removal of a finished (or damaged) product and the beginning of another product. Also, printing and cutting operations may employ the moving-table mode of operation.

Furthermore, the use of multiple carriages and the computer control of operations may make it practical to create objects using material-efficient methods similar to those described by Latapie, in French patent #2368101 of May 1978. In this method, one layer of an object would be made from material cut free from the inside of, and unneeded for, another layer of the object. A separate, perhaps lighter or less expensive, material may be used as internal support material, if required.

Additionally, the apparatus would include sensors which are designed to monitor the progress and quality of work and coordinate operations so as to assure accuracy and detect errors. In case of certain problems, the machine may be equipped to slice out, or grind off, an unsatisfactory portion and then resume construction at an appropriate level.

While this method is based on lamination without the usual "sheet stock," it is also possible to incorporate certain sheet-based methods at special points in the production of particular products. For instance, certain portions of a product may favor the use of factory-prepared sheet materials. Since accurate registration of supply stock is not essential, these separate sheets could be loaded on to the product being formed in the lamination press, either by hand or by automated machinery. The other major change would be in the simple omission of the slicing step. Shaping and selective bonding operations would proceed as if the sheet had been cut free from the supply block in the fashion which is normal to the method.

All such variations and modifications noted above are intended to be within the scope of the present invention as defined by the appended claims.

I claim:

1. A method of constructing a three-dimensional object having a predetermined shape, the method comprising the steps of:
   a. providing a block of supply material,
   b. providing a lamination means for holding and pressing the block,
   c. providing a slicing means for cutting the block to form a horizontal layer having a first working surface and a cut block having a second working surface,
   d. providing a profiling means for profiling at least one of the working surfaces into a planar element, and
   e. providing an electronic means for receiving XYZ information corresponding to the shape of the object, for processing the XYZ information into a plurality of computerized cross-sectional representations of the shape, and for controlling the operation of said lamination means, said slicing means, and said profiling means, and
   f. providing the electronic means with the XYZ information,
   g. placing the block in a position for holding by the lamination means,
   h. slicing the block using the slicing means to provide the horizontal layer having the first working surface and the cut block having the second working surface, the layer and the cut block each held by the lamination means,
   i. profiling at least one of the working surfaces using the profiling means to form the planar element having a shape corresponding to said computerized cross-section representation at that slicing level,
   j. pressing the second working surface of the block in step i against the layer of step i using the lamination means, and
   k. repeating said steps h, i, and j until the object is formed.

2. The method of claim 1 further including the step of applying a material to facilitate bonding of the layers.

3. The method of claim 1 further including the steps of:
   l. applying a material to facilitate bonding of the layers, and
   m. profiling both of the working surfaces.

4. The method of claim 1 further including the steps of:
   l. providing a carriage means for automated handling of the layer formed in step h, and
   m. providing a motion means for moving the carriage means between separate work stations, wherein various operations are performed on the layer by different tools at the work stations.

5. The method of claim 1 further including the steps of:
   l. providing a carriage means for automated handling of the layer formed in step h,
   m. providing a motion means for moving the carriage means between separate work stations, wherein various operations are performed on the layer by different tools at the work stations, and
   n. applying a material to facilitate bonding of the layers.

6. The method of claim 1 further including the steps of:
   l. providing a carriage means for automated handling of the layer and the cut block formed in step h,
   m. providing a motion means for moving the carriage means between separate work stations, wherein various operations are performed on the layer and the cut block by different tools at the work stations,
   n. applying a material to facilitate bonding of the layers, and
   o. profiling both of the working surfaces.

7. A method of constructing a three-dimensional object having a predetermined shape, the method comprising the steps of:
   a. providing a block of supply material,
   b. providing a lamination means for holding and pressing the block,
   c. providing a slicing means for cutting the block to form a horizontal layer having a first working surface and a cut block having a second working surface,
   d. providing a profiling means for profiling at least one of the working surfaces into a planar element, and
   e. providing an electronic means for receiving XYZ information corresponding to the shape of the object, for processing the XYZ information into a plurality of computerized cross-sectional representations of the shape, and for controlling the operation of said lamination means, said slicing means, and said profiling means; the lamination means has a first part and a second part, where the first part holds the block and the cut block after slicing of the block and the second part holds the horizontial layer and where a vertical distance between the first part and the second part is controlled by the electronic means to position the block in the correct position for slicing and profiling, and
   f. providing the electronic means with the XYZ information,
   g. placing the block in a position for holding by the lamination means,
   h. slicing the block using the slicing means to provide the horizontal layer having the first working surface and the cut block having the second working surface, the layer and the cut block each held by the lamination means,
   i. profiling at least one of the working surfaces using the profiling means to form the planar element having a shape corresponding to said computerized cross-section representation at that slicing level,
   j. pressing the second working surface of the block in step i against the layer of step i using the lamination means, and
   k. repeating said steps h, i, and j until the object is formed.

8. The method of claim 7 further including the step of applying a material to facilitate bonding of the layers.

9. The method of claim 7 further including the steps of:
   l. applying a material to facilitate bonding of the layers, and
   m. profiling both of the working surfaces.

10. The method of claim 7 further including the steps of:
l. providing a carriage means for automated handling of the layer formed in step h,
m. providing a motion means for moving the carriage means between separate work stations, wherein various operations are performed on the layer by different tools at the work stations, and
n. applying a material to facilitate bonding of the layers.

11. The method of claim 7 further including the steps of:
l. providing a carriage means for automated handling of the layer formed in step h,
m. providing a motion means for moving the carriage means between separate work stations, wherein various operations are performed on the layer by different tools at the work stations,
n. applying a material to facilitate bonding of the layers, and
o. profiling both of the working surfaces.

12. An apparatus for constructing a three-dimensional object having a predetermined shape, the apparatus comprising:
a. a lamination means for holding and pressing a block of supply material,
b. a slicing means for cutting the block held by the lamination means to form a horizontal layer having a first working surface and a cut block having a second working surface,
c. a profiling means for profiling at least one of the working surfaces into a planar element while both the cut block and the horizontal layer are held by the lamination means, and
d. an electronic means for receiving XYZ information corresponding to the shape of the object, for processing the XYZ information into a plurality of computerized cross-sectional representations of the shape, and for coordinating said lamination means, said slicing means, and said profiling means to form the object.

13. The apparatus of claim 12 further including an application means for placing a material to facilitate bonding of the layers.

14. The apparatus of claim 12 further including:
e. an application means for placing a material to facilitate bonding of the layers, and
f. that the profiling means is able to profile both the working surfaces.

15. The apparatus of claim 12 further including:
e. an application means for placing a material to facilitate bonding of the layers,
f. at least one carriage for holding the layers where the at least one carriage is capable of automated motion between work stations, and
g. a motion means for moving the at least one carriage between the work stations, wherein operations are performed on the layers at the work stations.

16. The apparatus of claim 12 further including:
e. an application means for placing a material to facilitate bonding of the layers,
f. a plurality of carriages for holding the layers and the cut blocks where the plurality of carriages are capable of automated motion between work stations,
g. a motion means for moving the carriages between the work stations, wherein operations are performed on the layers and the cut blocks at the work stations, and
h. that the profiling means is able to profile both the working surfaces.

17. An apparatus for constructing a three-dimensional object having a predetermined shape, the apparatus comprising:
a. a lamination means for holding and pressing a block of supply material,
b. a slicing means for cutting said block held by the lamination means to form a horizontal layer having a first working surface and a cut block having a second working surface,
c. a profiling means for profiling at least one of the working surfaces into a planar element while both the cut block and the horizontal layer are held by the lamination means, and
d. an electronic means for receiving XYZ information corresponding to the shape of the object, for processing the XYZ information into a plurality of computerized cross-sectional representations of the shape, and for coordinating said lamination means, said slicing means, and said profiling means to form the object; the lamination means has a first part and a second part where the first part holds the block and the cut block after slicing of the block and the second part holds the horizontal layer and where a vertical distance between the first part and the second part is controlled by the electronic means to position the block in the correct position for slicing and profiling.

18. The apparatus of claim 17 further including an application means for placing a material to facilitate bonding of the layers.

19. The apparatus of claim 17 further including:
e. an application means for placing a material to facilitate bonding of the layers, and
f. that the profiling means is able to profile both the working surfaces.

20. The apparatus of claim 17 further including:
e. an application means for placing a material to facilitate bonding of the layers,
f. at least one carriage for holding the layers where the at least one carriage is capable of automated motion between work stations, and
g. a motion means for moving the at least one carriage between the work stations, wherein operations are performed on the layers at the work stations.

21. The apparatus of claim 17 further including:
e. an application means for placing a material to facilitate bonding of the layers,
f. a plurality of carriages for holding the layers and the cut blocks and where the plurality of carriages are capable of automated motion between work stations,
g. a motion means for moving the carriages between the work stations, wherein operations are performed on the layers and the cut blocks at the work stations, and
h. that the profiling means is able to profile both the working surfaces.

* * * * *